(12) United States Patent
Wang et al.

(10) Patent No.: US 7,487,502 B2
(45) Date of Patent: Feb. 3, 2009

(54) PROGRAMMABLE EVENT DRIVEN YIELD MECHANISM WHICH MAY ACTIVATE OTHER THREADS

(75) Inventors: Hong Wang, Fremont, CA (US); Per Hammarlund, Hillsboro, OR (US); Xiang Zou, Beaverton, OR (US); John Shen, San Jose, CA (US); Xinmin Tian, Union City, CA (US); Milind Girkar, Sunnyvale, CA (US); Perry Wang, San Jose, CA (US); Piyush Desai, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 723 days.

(21) Appl. No.: 10/370,251

(22) Filed: Feb. 19, 2003

(65) Prior Publication Data
US 2004/0163083 A1 Aug. 19, 2004

(51) Int. Cl.
*G06F 9/46* (2006.01)
*G06F 9/44* (2006.01)
*G06F 9/45* (2006.01)
(52) U.S. Cl. .................... 718/102; 717/127; 703/22
(58) Field of Classification Search ............ 718/104, 718/102; 710/260; 709/224; 719/312; 717/127; 703/22
See application file for complete search history.

(56) References Cited
U.S. PATENT DOCUMENTS

| | | | | |
|---|---|---|---|---|
| 4,807,231 A | * | 2/1989 | Sato .................... | 714/809 |
| 5,471,618 A | * | 11/1995 | Isfeld .................... | 710/19 |
| 5,526,283 A | * | 6/1996 | Hershey et al. .......... | 709/224 |
| 5,978,857 A | * | 11/1999 | Graham ................. | 719/312 |
| 6,493,741 B1 | | 12/2002 | Emer et al. | |
| 6,779,065 B2 | * | 8/2004 | Murty et al. ........... | 710/260 |
| 2002/0059425 A1 | * | 5/2002 | Belfiore et al. ......... | 709/226 |
| 2002/0124237 A1 | * | 9/2002 | Sprunt et al. ........... | 717/127 |
| 2003/0145314 A1 | * | 7/2003 | Nguyen et al. .......... | 717/158 |

OTHER PUBLICATIONS

Zilles, Craig; Sohi, Guri, "Time-Shifted Modules: Exploiting Code Modularity for Fine Grain Parallelization," University of Wisconsin Technical Report—TR1430, Oct. 2001. (bibtex).

Lewandowski, Scott M., "Intel X86 Assembly and Debugging Support," CS295-2: Advanced Topics in Debugging; Sep. 21, 1998, 47 pages.

(Continued)

*Primary Examiner*—Meng-Ai An
*Assistant Examiner*—Camquy Truong
(74) *Attorney, Agent, or Firm*—David P. McAbee

(57) ABSTRACT

Method, apparatus, and program means for a programmable event driven yield mechanism that may activate other threads. In one embodiment, an apparatus includes execution resources to execute a plurality of instructions and a monitor to detect a condition indicating a low level of progress. The monitor can disrupt processing of a program by transferring to a handler in response to detecting the condition indicating a low level of progress. In another embodiment, thread switch logic may be coupled to a plurality of event monitors which monitor events within the multithreading execution logic. The thread switch logic switches threads based at least partially on a programmable condition of one or more of the performance monitors.

37 Claims, 12 Drawing Sheets

OTHER PUBLICATIONS

Kessler, R.E., "The Alpha 21264 Microprocessor," IEEE Micro, Mar./Apr. 1999, pp. 24-36.

El-Moursey, Ali; and Albonesi, David H., "Front-End Policies for Improved Issue Efficiency in SMT Processors," 9th Int'l Symposium on High-Performance Computer Architecture, Feb. 2003, 10 pages.

S. G. Abraham and B. R. Rau. Predicting load latencies using cache profiling. In *Hewlett Packard Lab, Technical ReportHPL-94-110*, Dec. 1994.

M. Carlisle. Olden: Parallelizing programs with dynamic data structures on distributed-memory machines. In *PhD Thesis, Princeton University Department of Computer Science*, Jun. 1996.

R. Chappell, J. Stark, S. Kim, S. Reinhardt, and Y. Patt. Simultaneous subordinate microthreading (ssmt). In *26th Annual International Symposium on Computer Architecture*, pp. 186-195, Oct. 1999.

J. Emer. Simultaneous multithreading: Multiplying alpha's performance. In *Microprocessor Forum*, Oct. 1999.

J. B. et al. The intel ia-64 compiler code generator. In *IEEE Micro*, pp. 44-53, Sep.-Oct. 2000.

R. K. et al. An advanced optimizer for the ia-64 architecture. In *IEEE Micr*, pp. 60-68, Nov.-Dec. 2000.

J. Huck, D. Morris, J. Ross, A. Knies, H. Mulder, and R. Zahir. Introducing the ia-64 architecture. In *IEEE Micro*, pp. 12-23, Sep.-Oct. 2000.

D. Joseph and D. Grunwald. Prefetching using markov predictors. In *24th Annual International Symposium on Computer Architecture*, Jun. 1997.

Y. Kim, M. Hill, and D.Wood. Implementing stack simulation for highly-associative memories (extended abstract). In *ACM Sigmetrics*, pp. 212-213, May 1991.

A. Roth, A. Moshovos, and G. Sohi. Dependence based prefetching for linked data structures. In *Eighth International Conference on Architectural Support for Programming Languages and Operating Systems*, Oct. 1998.

A. Roth and G. Sohi. Speculative data-driven multithreading. in *Seventh International Symposium on High Performance Computer Architecture*, pp. 37-48, Jan. 2001. *and Operating Systems*, pp. 257-268, Nov. 2000.

H. Sharangpani and K. Aurora. Itanium processor microarchitecture. In *IEEE Micro*, pp. 24-43, Sep.-Oct. 2000.

Y. Song and M. Dubois. Assisted execution. In *Technical Report CENG 98-25, Department of EE-Systems, University of Southern California*, Oct. 1997.

K. Sundaramoorthy, Z. Purser, and E. Rotenberg. Slipstream processors: Improving both performance and fault tolerance. In *Ninth International Conference on Architectural Support for Programming Languages*.

D. Tullsen, S. Eggers, J. Emer, H. Levy, J. Lo, and R. Stamm. Exploiting choice: Instruction fetch and issue on an implementable simultaneous multithreading processor. In *23rd Annual International Symposium on Computer Architecture*, pp. 191-202, May 1996.

D. M. Tullsen, S. J. Eggers, and H. M. Levy. Simultaneous multithreading: Maximizing on-chip parallelism. In *22nd Annual International Symposium on Computer Architecture*, pp. 392-403, Jun. 1995.

R. Uhlig, R. Fishtein, O. Gershon, I. Hirsh, and H. Wang. Softsdv: A presilicon software development environment for the ia-64 architecture. In *Intel Technology Journal*, 4th quarter1999.

S. Wallace, B. Calder, and D. M. Tullsen. Threaded multiple path execution. In *25th Annual International Symposium on Computer Architecture*, pp. 238-249, Jun. 1998.

H. Wang and et al. A conjugate flow processor. In *Patent Pending*, May 2000.

C. Young, N. Gloy, and M. D. Smith. A comparative analysis of schemes for correlated branch prediction. In *22nd Annual International Symposium on Computer Architecture*, pp. 276-286, May 1995.

C. Zilles and G. Sohi. Understanding the backward slices of performance degrading instructions. In *27th Annual International Symposium on Computer Architecture*, pp. 172-181, Jun. 2000.

J. Collins, H. Wang, D. Tullsen, H. C, Y.-F. Lee, D. Lavery, and J. Shen. Speculative Precomputation: Long-range Prefetching of Delinquent Loads. In *28th International Symposium on Computer Architecture*, Jul. 2001.

J. Dundas and T. Mudge. Improving Data Cache Performance by Pre-Executing Instructions Under a Cache Miss. In *11th Supercomputing Conference*, Jul. 1997.

M. K. Farrens, P. Ng, and P. Nico. A Comparison of Superscalar and Decoupled Access/Execute Architectures. In *26th International Symposium on Microarchitecture*, Nov. 1993.

J. L. Henning. SPEC CPU2000: measuring CPU performance in the new millennium. *IEEE Computer*, Jul. 2000.

G. Hinton, D. Sager, M. Upton, D. Boggs, D. Carmean, A. Kyker, and P. Roussel. The Microarchitecture of the Pentium 4 Processor. *Intel Technology Journal*, Q1 2001.

K. Olukotun, B. Nayfeh, L. Hammond, K. Wilson, and K. Chang. The Case for a Single-Chip Multiprocessor. In *7th International Conference on Architectural Support for Programming Languages and Operating Systems*, Oct. 1996.

S. Palacharla, N. Jouppi, and J. Smith. Complexity-Effective Superscalar Processors. In *24th International Symposium on Computer Architecture*, 1997.

A. Roth, C. B. Zilles, and G. S. Sohi. Microarchitectural Miss/Execute Decoupling. In *MEDEA Workshop*, Oct. 2000.

H. Sharangpani and K. Aurora. Itanium Processor Microarchitecture. *IEEE Micro*, Sep.-Oct. 2000.

J. E. Smith. Decoupled Access/Execute Computer Architecture. In *9th International Symposium on Computer Architecture*, Jul. 1982.

S. Srinivasan and A. Lebeck. Load Latency Tolerance in Dynamically Scheduled Processors. In *31st International Symposium on Microarchitecture*, Nov. 1998.

K. Sundaramoorthy, Z. Purser, and E. Rotenberg. Slipstream processors: Improving both performance and fault tolerance. In *Ninth International Conference on Architectural Support for Programming Languages*, Nov. 2000.

P.Wang, H. Wang, R. Kling, K. Ramakrishnan, and J. Shen. Register Renaming and Scheduling for Dynamic Execution of Predicated Code. In *7th IEEE International Symposium on High Performance Computer Architecture*, Jan. 2001.

D. Marr, et al., "Hyper-Threading Technology Architecture and Microarchitecture," *IntelTechnology Journal*, Q1, 2002.

T. Aamodt, A. Moshovos, and P. Chow. The Predictability of Computations that Produce Unpredictable Outcomes. In *5th Workshop on Multithreaded Execution, Architecture and Compilation*, pp. 23-34, Austin, Texas, Dec. 2001.

H. Agrawal and J. R. Horgan. Dynamic Program Slicing. In *Proceedings of the SIGPLAN Conference on Programming Language Design and Implementation*, pp. 246-256, Jun. 1990.

M. Annavaram, J. Patel, E. Davidson. Data Prefetching by Dependence Graph Precomputation. In *28th International Symposium on Computer Architecture*, Jul. 2001.

K. Cooper, P. Schielke, D. Subramanian. An experimental evaluation of list scheduling. Rice University Technical Report 98-326, Sep. 1998.

R. Ghiya, D. Lavery, and D. Sehr. On the importance of points-to analysis and other memory disambiguation methods for C programs. In SIGPLAN Conference on Programming Language Design and Implementation, pp. 47-58, Jun. 2001.

A. V. Goldberg and R. E. Tarjan. A new approach to the maximum-flow problem. In Journal of the Association for Computing Machinery, 35(4):921-940, Oct. 1988.

R. Gupta and M. L. Soffa. Hybrid slicing: an approach for refining static slicing using dynamic information. In The Foundations of Software Engineering, pp. 29-40, Sep. 1995.

G. Hinton and J. Shen. Intel's multi-threading technology. *Microprocessor Forum*, Oct. 2001.

R. Krishnaiyer, D. Kulkarni, D. Lavery, W. Li, C. Lim, J. Ng, D. Sehr. An Advanced Optimizer for the IA-64 Architecture, *IEEE Micro*, Nov.-Dec. 2000.

W. Landi and B. Ryder. A Safe Approximate Algorithm for Interprocedural Pointer Aliasing. In *SIGPLAN '92 Conference on Programming Language Design and Implementation*, pp. 235-248, Jun. 1992.

S. Liao. SUIF Explorer. PhD thesis, Stanford University, Aug. 2000, Stanford Technical Report CSL-TR-00-807.

S. Liao, A. Diwan, R. Bosch, A. Ghuloum, M. S. Lam. SUIF Explorer: an interactive and interprocedural parallelizer. In Proceedings of the 7th ACM SIGPLAN Symposium on Principles and Practice of Parallel Programming, pp. 37-48, Atlanta, Georgia, May 1999.

C. K. Luk, Tolerating Memory Latency through Software-Controlled Pre-Execution in Simultaneous Multithreading Processors, In *28th International Symposium on Computer Architecture*, Jun. 2001.

D. Marr, F. Binns, D. Hill, G. Hinton, D. Koufaty, J. Miller, M. Upton. Hyper-threading technology architecture and microarchitecture. *Intel Technology Journal*, vol. 6, Issue on Hyper-threading, Feb. 2002.

A. Moshovos, D. Pnevmatikatos, A. Baniasadi. Slice processors: an implemantation of operation-based prediction. In International Conference on Supercomputing, Jun. 2001.

H. Wang, P. Wang, R. D. Weldon, S. Ettinger, H. Saito, M. Girkar, S. Liao, J. Shen. Speculative proecomputation: exploring use of multithreading technology for latency. In *Intel Technology Journal*, vol. 6, Issue on Hyperthreading, Feb. 2002.

P. Wang, H. Wang, J. Collins, E. Grochowski, R. Kling, J. Shen. Memory latency-tolerance approaches for Itanium processors: out-of-order execution vs. speculative precomputation. In *Proceedings of the 8th IEEE High- Performance Computer Architecture*, Cambridge, Massachusetts, Feb 2002.

M. Weiser. Program slicing. In *IEEE Transactions on Software Engineering*, 10(4), pp. 352-357, 1984.

C. Zilles and G. Sohi. Understanding the backward slices of performance degrading instructions. In *27th International Symposium on Computer Architecture*, Vancouver, BC, Canada, May 2000.

C. Zilles and G. Sohi. Execution-based prediction using speculatives slices. In *28th International Symposium on Computer Architecture*, Goteborg, Sweden, Jul. 2001.

T. Aamodt, P. Marcuello, P. Chow, P. Hammarlund, H. Wang, and J. Shen. Hardware Support for Prescient Instruction Prefetch. In 10th International Symposium on High Performance Computer Architecture, Feb. 2004.

A. Agarwal, B. Lim, D. Kranz, and J. Kubiatowicz. April: A Processor Architecture for Multiprocessing. In 17th Inter- national Symposium on Computer Architecture, Jun. 1990.

M. Annavaram, J. M. Patel, and E. S. Davidson, Data Prefetching by Dependence Graph Precomputation. In 28th International Symposium on Computer Architecture, pp. 52-61, Goteborg, Sweden, Jun. 2001. ACM.

J. M. Borkenhagen, R. J. Eickemeyer, R. N. Kalla, and S. Kunkel. A Multithreaded PowerPC Processor for Commercial Servers. IBM Journal of Research and Development, 44(6):885-898, 2000.

R. S. Chappell, S. P. Kim, S. K. Reinhardt, and Y. N. Patt. Simultaneous Subordinate Microthreading (SSMT). In 26th International Symposium on Computer Architecture, pp. 186-195, Atlanta, GA, May 1999. ACM.

R. S. Chappell, F. Tseng, A. Yoaz, and Y. N. Patt. Difficult- path Branch Prediction Using Subordinate Microthreads. In 29th International Symposium on Computer Architecture, Anchorage, AK, May 2002.

J. Collins, D. Tullsen, H. Wang, and J. Shen. Dynamic Speculative Precomputation. In Proceedings of the 34th Annual ACM/IEEE International Symposium on Microarchitecture, pp. 306-317, Austin, TX, Dec. 2001. ACM.

R. Eickemeyer, R. Johnson, S. Kunkel, B.-H. Lim, M. Squillante, and C. Wu. Evaluation of Multithreaded Processors and Thread Switch Policies. In International Symposium on High Performance Computing, pp. 75-90, Fukuoka, Japan, Nov. 1997.

M. K. Farrens and A. R. Pleszkun. Strategies for Achieving Improved Processor Throughput. In 18th International Symposium on Computer Architecture, May 1991.

J. W. Haskins Jr., K. R. Hirst, and K. Skadron. Inexpensive Throughput Enhancement in Small-Scale Embedded Microprocessors with Block Multithreading: Extensions, Characterization, and Trades. In 20th International Performance, Computing, and Communications Conference, Apr. 2001.

D. Kim, S. Liao, P. Wang, J. del Cuvillo, X. Tian, X. Zou, H. Wang, D. Yeung, M. Girkar, and J. Shen. Physical Experimentation with Prefetching Helper Threads on Intel's Hyper-Threaded Processors. In International Symposium on Code Generation and Optimization. Mar. 2004.

D. Kim and D. Yeung. Design and Evaluation of Compiler Algorithms for Pre-Execution. In 10th Architectural Support for Programming Languages and Operating Systems, pp. 159-170, Oct. 2002.

S. Liao, P. Wang, H. Wang, G. Hoflehner, D. Lavery, and J. Shen. Post-Pass Binary Adaptation for Software-Based Speculative Precomputation. In ACM Conference on Programming Language Design and Implementation, Jun. 2002.

T. C. Mowry, C. Q. Chan, and A. K. Lo. Comparative Evaluation of Latency Tolerance Techniques for Software Distributed Shared Memory. In 4th International Symposium on High Performance Computer Architecture, Feb. 1998.

T. C. Mowry, M. S. Lam, and A. Gupta. Design and Evaluation of a Compiler Algorithm for Prefetching. In 5th International Conference on Architectural Support for Programming Languages and Operating Systems, Oct. 1992.

O. Mutlu, J. Stark, C. Wilkerson, and Y. Patt. Runahead Execution: An Alternative to Very Large Instruction Windows for Out-of-order Processors. In 9th International Symposium on High Performance Computer Architecture, Jan. 2003.

V. Panait, A. Sasturkar, and W.-F. Wong. Static Identification of Delinquent Loads. In International Symposium on Code Generation and Optimization, Mar. 2004.

J. Redstone, S. Eggers, and H. Levy. Mini-threads: Increasing TLP on Small-Scale SMT Processors. In 9th International Symposium on High Performance Computer Architecture, Feb. 2003.

D. M. Tullsen, J. L. Lo, S. J. Eggers, and H. M. Levy. Supporting Fine-Grained Synchronization on a Simultaneous Multithreading Processor. In 5th International Symposium on High Performance Computer Architecture, Jan. 1999.

C. A. Waldspurger and W. E. Weihl. Register Relocation: Flexibel Contexts for Multithreading. In 20th International Symposium on Computer Architecture, May 1993.

\* cited by examiner

| # | EN | EMON # | CONDITION |
|---|----|--------|-----------|
| 1 |    |        |           |
| ... |  |        |           |
| N |    |        |           |

COMPOSITE EVENT MONITOR 500
510  511  512  514

| # | EN | CONDITION | TRIGGER |
|---|----|-----------|---------|
| 1 |    |           |         |
| ... |  |           |         |
| N |    |           |         |

COMPOSITE EVENT MONITOR 540
552  554  556

PROGRAMMABLE EVENT DRIVEN YIELD MECHANISM WHICH MAY ACTIVATE OTHER THREADS

BACKGROUND

1. Field

The present disclosure pertains to the field of processing apparatuses and systems that process sequences of instructions or the like, as well as certain instruction sequences to program such apparatuses and/or systems. Some embodiments relate to monitoring and/or responding to conditions or events within execution resources of such processing apparatuses.

2. Description of Related Art

Various mechanism are presently used to change the flow of control (i.e., the processing path or instruction sequence being followed) in a processing system. For example, a jump instruction in a program sequence explicitly and precisely causes a jump to a new address. The jump instruction is an example of an explicit change of the control flow because the instruction directs the processor to jump to a location and continue executing at that point. A traditional jump instruction is "precise" (or synchronous) because the jump occurs as a direct result of execution of the jump instruction.

Another traditional example of a change in the flow of control is an interrupt. An interrupt may be an external signal provided to an apparatus such as a processor. The processor may respond by jumping to an interrupt handler, a routine that handles the event(s) signaled by a particular interrupt. Interrupts are typically also relatively precise in that they are recognized and acted upon by a processor within a particular window of time in relation to their receipt. In particular, interrupts are often serviced at the next instruction boundary after they are received internally. In some cases, only the operating system or other software operating at a high privilege level is allowed to mask interrupts, so a user program may have no opportunity to enable or disable these control flow changing events.

Another traditional example of a change in the flow of control occurs in response to an exception. An exception typically reflects a predefined architectural condition such as a result of a mathematical instruction meeting certain criteria (denormal, underflow, overflow, not a number, etc.). Some exceptions can be masked, for example, by setting a bit in a control register. If an exception occurs and is not masked, then an exception handler is called to handle the exception.

Another technique that changes the flow of control of a processor is the use of breakpoints. Breakpoints are typically used in debugging. A particular instruction address may be programmed into a breakpoint register. The processor may do various acts (other than continue with the program as usual) when a breakpoint is active and the target address is reached. Breakpoints allow single-stepping through a program, among other things.

Multi-threading is a technique by which processor hardware may be utilized by multiple different threads. Multi-threaded processors may switch between threads for a variety of reasons. For example, a processor may have an algorithm that automatically switches between available threads. Other processors use switch-on-event multithreading (SoEMT), whereby certain events such as a cache miss may give rise to a thread switch. Thread switching can be considered a change of control flow because the processor switches the sequence or stream which it executes.

In one prior art reference, a quiesce instruction is detailed (see U.S. Pat. No. 6,493,741). In one example, the quiesce instruction stops processing in one thread until either a timer expires or a memory write to a memory location occurs. Therefore, an instruction such as the quiesce instruction may itself trigger the temporary cessation of processing of the thread containing the quiesce instruction and a switch to another thread.

BRIEF DESCRIPTION OF THE FIGURES

The present invention is illustrated by way of example and not limitation in the Figures of the accompanying drawings.

DETAILED DESCRIPTION

The following description describes embodiments of a programmable event driven yield mechanism which may activate other threads. In the following description, numerous specific details such as processor types, microarchitectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

In some embodiments, disclosed techniques may allow a program to actively monitor and respond to conditions of the execution resources which execute the program while executing the program. Effectively, such embodiments may incorporate real-time execution resource operating condition feedback to improve performance. If the execution resources encounter execution delaying conditions, the program execution may be disrupted to make adjustments. In some embodiments, a handler may be activated and may spawn a helper thread to attempt to improve execution of the original thread.

In other embodiments, the disruption may be accomplished by switching to another program thread that may not be a helper thread. These and other embodiments may in some cases advantageously improve processing throughput and/or allow optimizations to be tailored to particular hardware.

Figure 1:
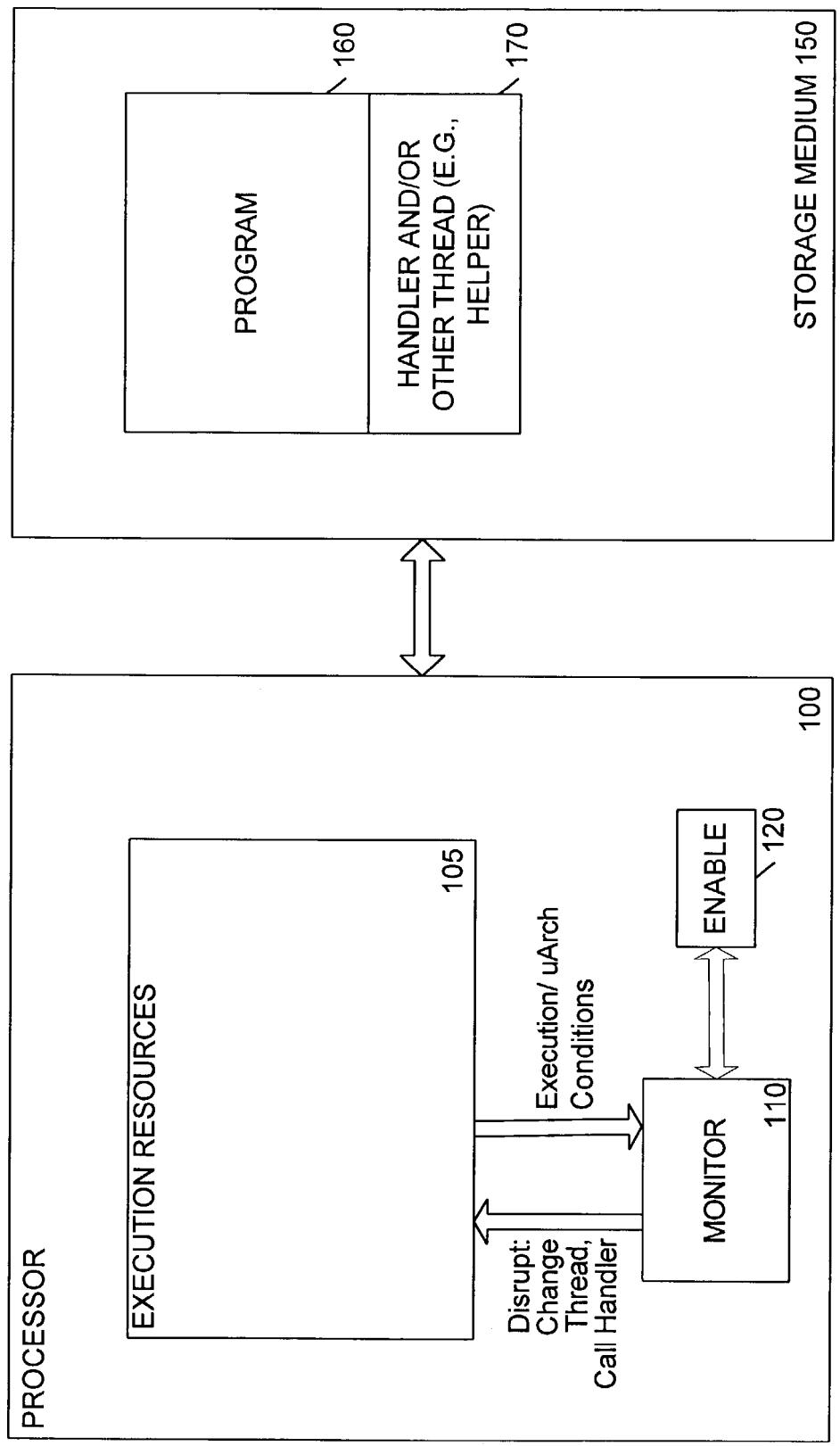
FIG. 1 illustrates one embodiment of a system that can detect and respond to processing conditions of execution resources.

Turning to FIG. 1, one embodiment of a system that can detect and respond to processing conditions of execution resources is illustrated. In the embodiment of FIG. 1, execution resources 105, a monitor 110, and enable logic 120 form a portion of a processor 100 that is capable of executing instructions. The execution resources may include hardware resources that may be integrated into a single component or integrated circuit in some embodiments. However the execution resources may include software or firmware resources or any combination of hardware and software and/or firmware that may also be used in execution of program instructions. For example, firmware may be used as a part of an abstraction layer or may add functions to processing hardware, as may software. Software also may be used to emulate part or all of an instruction set or to otherwise assist in processing.

The processor may be any of a variety of different types of processors that execute instructions. For example, the processor may be a general purpose processor such as a processor in the Pentium® Processor Family or the Itanium® Processor Family or other processor families from Intel Corporation or other processors from other companies. Thus, the processor may be a reduced instruction set computing (RISC) processor, a complex instruction set computing (CISC) processor, a very long instruction word (VLIW) processor, or any hybrid or alternative processor type. Moreover, special purpose processors such as network or communication processors, co-processors, embedded processors, compression engines, graphics processors, etc., may use disclosed techniques. As integration trends continue and processors become even more complex, the need to monitor and react to internal performance indicators may further increase, thus making presently disclosed techniques more desirable. However, due to rapid technological advance in this area of technology, it is difficult to foresee all the applications of disclosed technology, though they may be widespread for complex hardware that executes program sequences.

As shown in FIG. 1, the processor 100 is coupled to a storage medium 150 such as a memory. The storage medium 150 may be a memory subsystem having various levels of hierarchy which may include but are not limited to various levels of cache memory, system memory such as dynamic random access memory or the like, and non-volatile storage such as flash memory (e.g. memory stick etc), a magnetic or optical disk. As illustrated, the storage medium stores a program 160 and a handler and/or other thread such as a helper thread 170.

To allow the monitor to monitor the desired events, the monitor 110 may be coupled to various portions of execution resources in order to detect particular conditions or to be informed of certain microarchitectural events. Signal lines may be routed to the monitor 110, or the monitor may be strategically placed with or integrated with relevant resources. The monitor may include various programmable logic or software or firmware elements or may be custom designed to detect a particular condition. The monitor tracks the various events or conditions, and if the events or conditions it is programmed to detect occur, then the execution resources 105 are signaled to disrupt the normal control flow the program would otherwise follow. As indicated in FIG. 1, the disruption may result in an event handler being called or a thread switch occurring.

One example of a specific detectable condition is that data may be missing from a cache memory, resulting in the event of a cache miss occurring. In fact, a program may generate a pattern of memory accesses that causes repeated cache misses, thereby degrading performance. Such an occurrence of a certain number of cache misses within a period of time or during execution of a portion of code is one example of an event that indicates a relatively low level of progress is being made in executing that section of code.

Other detectable events which may be low progress indicators may relate to various other microarchitectural or structural details of the execution resources. A monitor may detect a condition involving one or more of a stall of a resource, a cache event, a retirement event, a branch or branch prediction result, an exception, a bus event, or a variety of other commonly monitored or performance-impacting events or conditions. The monitor may count or otherwise time, quantify, or characterize such events or conditions, and may be programmable when a particular metric associated with one or more events or conditions occurs.

Figure 2:
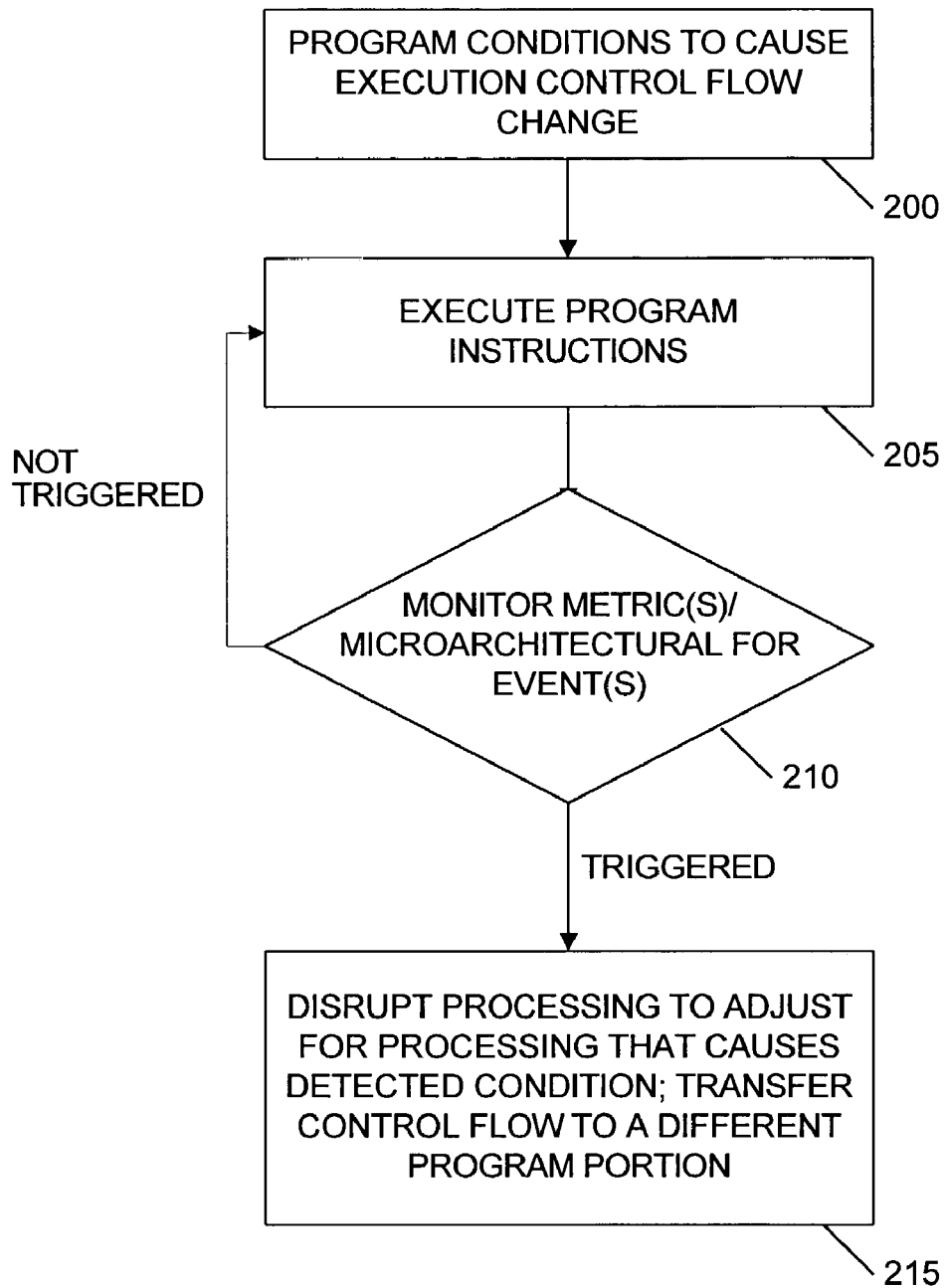
FIG. 2 illustrates a flow diagram of operations for one embodiment of the system of FIG. 1.

FIG. 2 illustrates a flow diagram of operations for one embodiment of the system of FIG. 1. As indicated in block 200 of FIG. 2, the program 160 may set conditions to cause a change in the execution control flow. For example, the enablement logic 120 may control both activation of the monitor and which event(s) to detect. Alternatively, the enablement logic 120 may enable and/or mask events, and the monitor 110 may itself also be programmable for further flexibility in specifying the events or conditions within the execution resources or system that are tracked. In either case, the program 160 itself may specify conditions that are to be watched during its own execution. The program 160 may also provide the handler or thread 170 which is activated when the monitored condition(s) occur. For example, the program may be a program which includes a main thread and a helper thread or helper routine that attempts to improve execution of the main thread if conditions the program specifies occur.

As indicated in block 205, the program instructions are executed. Execution of the program causes the state of the execution resources to change. For example, a variety of conditions may occur or be present that inhibit forward progress in execution of the program. As indicated in block 210, the various processing metrics and/or microarchitectural conditions may be monitored to determine if the triggering event programmed in block 200 occurs. If the triggering state does not occur in block 210, the monitor is not triggered, and program execution continues by returning to block 205.

In some cases, the triggering state bears only an indirect relationship to execution of any single instruction. For example, a prior art breakpoint detector typically causes a break when an instruction pointer reaches a designed address. Such breakpoints are precise because a particular instruction (i.e., its address) directly triggers the break. Also, the prior art quiesce instruction itself causes a thread to stop at least temporarily. In contrast, some embodiments utilizing disclosed techniques trigger control flow changes on a set of conditions that are not necessarily caused by a single instruction, but rather may be caused by the overall program flow and/or system environment. Thus, while the monitor may repeatedly trigger at the same instruction execution state in a single system, other conditions, environments, system, etc., may cause different trigger points for the same program. In this sense, disclosed techniques, in some cases, provide an imprecise or asynchronous mechanism generating a control flow change that is not directly tied to an instruction execution boundary. Moreover, such an imprecise mechanism may, in some embodiments, test for events at a less fine granularity than each instruction and/or may delay recognition of events for some period of time because architectural correctness does not depend on any processing-rate-enhancing helper routines executing at any particular point in time.

When the triggering state is detected by the monitor in block 210, processing of the program is disrupted as indicated in block 215. Generally, the system may responsively adjust because processing of the program is occurring inefficiently or in a manner other than the manner the programmer desired. For example, another software routine such as another program portion may be invoked. The other program portion may be another thread unrelated to the original thread or may be a helper thread that helps execute the original thread, for example by prefetching data to reduce cache misses. Alternatively, a program-transparent (e.g., hardware) mechanism may perform some optimizations, reconfiguration (including, but not limited to reconfiguration of the monitor setup), reallocation of resources or the like to hopefully improve processing.

Figure 3:
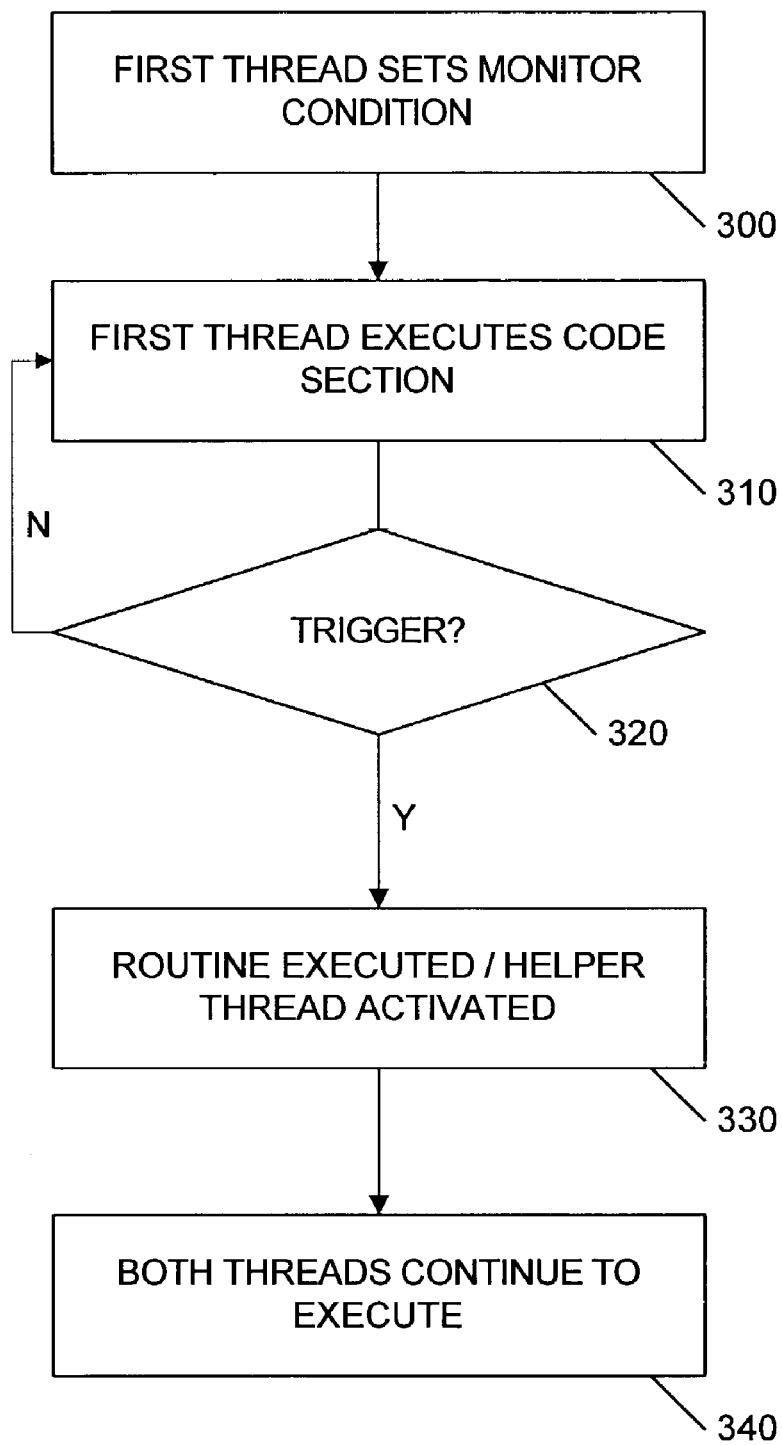
FIG. 3 illustrates a flow diagram of operations for another embodiment of the system of FIG. 1.

One example which invokes a helper thread is illustrated in FIG. 3. In particular, the flow diagram of FIG. 3 details operations for one embodiment of the system of FIG. 1 in which the execution resources are multithreaded resources and the program invokes a helper thread when a certain triggering condition occurs. Thus, as indicated in block 300, a first thread (e.g., a main program) sets a monitor condition. The condition may be any one or more of the variety of conditions discussed herein. The first thread executes a code section as indicated in block 310. If the triggering condition does not occur, as tested in block 320, then the code section continues executing, as indicated in block 310.

If the triggering condition does occur, then a helper thread is activated to assist the first thread as indicated in block 330. The helper thread may be activated by a routine such as a handler routine or just be activated by a thread switch. For example, in one embodiment, the trigger condition signaled by the monitor to the execution resource may cause the execution resource to jump to an event handler that spawns a helper thread. In another embodiment, the helper thread may just be one of the other active threads. In yet another embodiment, one or more special helper thread execution slots may be provided by the processor and the monitor may cause a switch to a helper thread from one of these slots. As indicated in block 340, both threads may then continue to execute. Hopefully, the helper thread, runs ahead and clears up conditions that would otherwise cause the first thread to stall or perform poorly.

Figure 4:
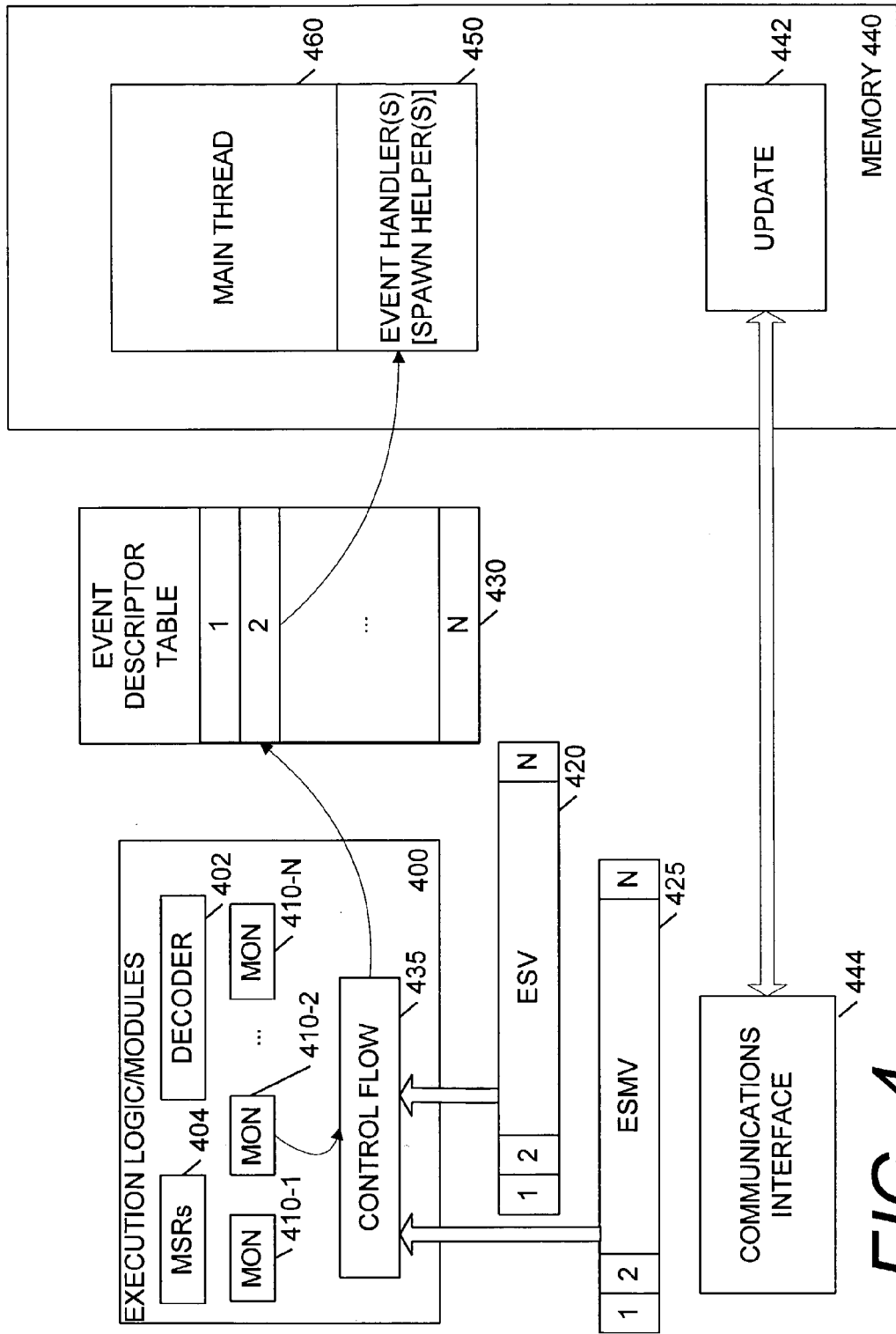
FIG. 4 illustrates another embodiment of a system that can respond to multiple different performance events and/or to composite performance events.

FIG. 4 illustrates another embodiment of a system that can respond to multiple different performance events and/or to composite performance events. In the embodiment of FIG. 4, execution resources 400 are shown as including a set of N monitors 410-1 through 410-N. Additionally, an event schema vector (ESV) storage location 420 and an event schema vector mask (ESVM) storage location 425 are provided. The embodiment of FIG. 4 shows a number of monitors (N) corresponding to the number of bits in the event schema vector and the event schema mask vector. In other embodiments, there may be different numbers of monitors and bits in these vectors, and the monitors may or may not correlate directly to the bits. For example, a condition involving multiple monitors may correlate to a single vector bit in some embodiments.

The execution resources 400 are optionally coupled to an event descriptor table 430 (EDT), which may be locally implemented on the processor or in a co-processor or system memory. Control flow logic 435 is coupled the monitors 410-1 through 410-N and to receive values from the event schema vector and the event schema vector mask. The control flow logic 435 changes the control flow for processing logic when a condition detected by one or more of the monitors is enabled according to the event schema vector and event schema vector mask.

The embodiment of FIG. 4 also illustrates decode logic 402 and a set of machine or model specific registers 404 (MSRs). Either or both of the decode logic 402 and the model specific registers may be used to program and/or activate the monitors and the event schema vector and mask. For example, MSRs may be used to program the types or number of events that trigger the monitors. MSRs may also be used to program the event schema vector and mask. Alternatively, one or more new dedicated instruction(s) to be decoded by the decoder 402 may be used for either or both of programming the monitors and the event schema vector and mask. For example, a yield instruction may be used to enable disruption of processing a program when a certain set of conditions occurs. Some or all of the conditions may be specified by an operand to the yield instruction or otherwise programmed in advance of its execution. Such a yield instruction may be decoded by the decoder 402 to trigger a microcode routine, to produce a corresponding micro-operation or micro-instruction, or sequences of micro-operations to directly signal appropriate logic, or activate a co-processor or to otherwise implement the yield functionality. The concept of yielding may appropriately describe the instruction in some embodiments in which one thread is allowed to continue after executing the yield instruction but may be slowed at some point by execution of another thread or handler. For example, a largely single-threaded program may invoke extra helper threads and share the processor with those extra helper threads.

In the embodiment of FIG. 4, a memory 440 includes event handlers 450 and a main thread 460. In some embodiments, the event descriptor table may be stored in the same memory or in the same memory hierarchy as the main thread 460 and handlers 450. As previously discussed, the handler(s) may spawn a helper thread to assist the main program in executing efficiently.

The memory 440 may also store an update module 442 to communicate via a communications interface 444. The update module 442 may be a hardware module or a software routine executed by the execution resources to obtain new conditions to be programmed into various monitors and/or enablement logic. The update module 442 may also obtain new helper threads or routines. For example, these may be downloaded by a software program from the vendor of the software program to provide enhanced performance. Thus, the network interface 444 may be any network and/or communication interface that allows information transfer via a communication channel. In some cases, the network interface may interface to the Internet to download new conditions and/or helper routines or threads.

In one embodiment, each bit of the event schema vector indicates the occurrence or non-occurrence of a particular event, with the particular event possibly being a composite event reflective of (and/or expressed via Boolean operations in terms of) a variety of conditions or other events. Occurrence of the particular event may set the bit in the event schema vector. Each bit in the event schema vector may have a corresponding bit in the event schema mask vector. If the mask bit indicates that the particular event is masked, then the control flow logic 435 may disregard the event, although the bit in the event schema vector may remain set due to its occurrence. The user may choose whether to clear the event schema vector when unmasking events. Thus, an event may be masked for some time and handled later. In some embodiments, the user may choose to specify the trigger as a level trigger or an edge trigger, depending upon various issues such as the relationship between event update, sampling and reset (or the hold time of a trigger event in the ESV)

If the mask bit indicates that an event is unmasked, then the control flow logic 435 calls an event handler for that particular event in this embodiment. The control flow logic 435 may vector into the event descriptor table 430 based on the bit position in the event schema vector, and accordingly, the event descriptor table may have N entries corresponding to the N bits in the event schema vector. The event descriptor table may contain a handler address indicating an address to which the control flow logic 435 should re-direct execution, and may also include other information as may be useful in a particular embodiment. For example, privilege level, thread, process, and/or other information may be maintained or updated in the event descriptor table.

In another embodiment, the event descriptor table 430 may not be necessary or may be a single entry that indicates an address for a single event handler to handle all events. In this case, the entry may be stored in a register or other processor storage location. In one embodiment, a single handler may be used, and that handler may access the event schema vector to determine which event occurred and therefore how to respond. In another embodiment, the event schema vector may collectively define an event that causes the control flow logic 435 to call a handler. In other words, the event schema vector may represent a variety of conditions that together signal one event. For example, the event schema mask vector may be used to designate which of the events indicated by the event schema vector must occur to trigger execution of the handler. Each bit may represent a monitor reaching a programmable condition. When all the non-masked monitors reach their respective designated conditions, then the handler is called. Thus, the entire event schema vector may be used to designate some complex composite condition that should trigger the execution of the handler.

In another embodiment, multiple event schema vectors and masks may be used to designate different conditions. The different vectors may vector to different handlers via the event descriptor table or some other mechanism. In another embodiment, some bits of one or more event schema vectors may be grouped to form events that trigger the calling of handlers. A variety of other different permutations will be apparent to those of skill in the art.

Figures 5A, 5B, 5C:
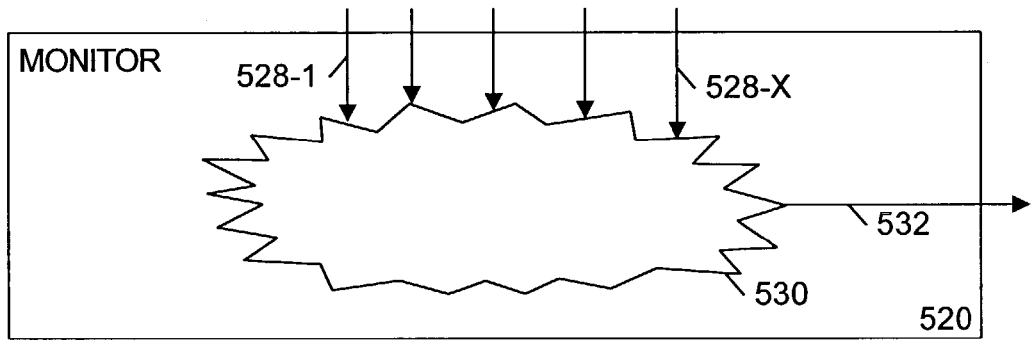
FIG. 5a illustrates one embodiment of a monitor that may recognize composite events.
FIG. 5b illustrates another embodiment of a monitor.
FIG. 5c illustrates another embodiment of a monitor.

FIG. 5a illustrates one embodiment of a monitor 500 that is programmable and capable of interfacing with a variety of performance monitors to signal a composite event. For example, such performance monitors may record occurrences of various microarchitectural events or conditions such as: cache misses incurred at a given level of cache hierarchy, branch retirement; branch misprediction (or retirement of mispredicted branches); trace cache delivery mode changes or events; branch prediction unit fetch requests; cancellations of memory request; cache line splits (count of completion of a split load, store, etc.); replay events; various types of bus transactions (e.g., locks, burst reads, writebacks, invalidates); allocations in a bus sequencer (or only certain types); numerical assist (an underflow, denormal, etc.); execution/retirement of a particular type of instruction or micro-operation (uOP); machine clear (or count of pipeline flushes); resource stalls (register renaming resources, pipeline, etc.); processing of tagged uOPs; instructions or uOPs retired; lines allocated (&/or of a particular state (e.g., M)) in cache; a number of cycles instruction fetch is stalled; a number of cycles instruction length decoder is stalled; a number of cache fetches; a number of lines allocated (or evicted) in cache or the like. These are only a few examples of microarchitectural events or conditions that may be monitored. Various other possibilities as well as combinations of these or other conditions will be apparent to one of skill in the art. Moreover, those and/or other conditions or events may be monitored with any of the disclosed or like monitors in any of the disclosed embodiments.

Performance monitors are often included in processors to count certain events. The programmer may read such performance monitors' counts by manufacturer-defined interfaces such as specific processor macro-instructions like the RDPMC instruction supported by known Intel Processors. See, e.g., Appendix A of Volume III of the Intel Software Developers Guide for the Pentium® 4 Processor. Other internal or micro-instructions or micro-operations may be used to read performance counters in some embodiments. Thus, for example, performance monitors may be adapted for use with disclosed techniques. In some cases, a programmable performance monitor may be modified to provide event signaling capabilities. In other embodiments, performance monitors may be readable by other monitors to establish events.

In the embodiment of FIG. 5a, the monitor 500 may include a set of programmable entries. Each entry may include an entry number 510, an enable field 511, a performance monitor number (EMON #) 512 to specify one of a set of performance monitors and a triggering condition 514. The triggering condition may be, for example, a certain count that is reached, a count that is reached within a certain period, a difference in count, etc. The monitor 500 may include logic to read or otherwise be coupled to receive counts from the designated performance monitors. The monitor 500 signals the control flow logic when the various M conditions occur. A subset of the M entries may be used by selectively programming the enable fields for each entry.

FIG. 5b illustrates another embodiment of a monitor 520. The monitor 520 represents a custom composite event monitor. The monitor 520 receives a set of signals via signal lines 528-1 through 528-X from various execution resources or resource portions and combines them via combinational logic 530. If the proper combination of signals is received, the monitor 520 signals the control flow logic via an output signal line 532.

FIG. 5c illustrates another embodiment of a monitor 540. The monitor 540 includes a table having M entries. Each entry includes an enable field 552, a condition field 554, and a trigger field 556. The condition field may be programmed to specify what combination of input signals is to be monitored. The conditions may or may not be tied to other event detecting structures such as performance monitors, and therefore may be more general than those discussed with respect to FIG. 5a. The trigger field 556 may specify the state of those input signals needed to signal the control flow logic. Again, each entry may be enabled/disabled via the enable field 552. In some embodiments, the condition and trigger fields may be combined. Various combinations of these and other types of known or otherwise available like, simpler, or more complex monitors will be apparent to one of skill in the art.

Figure 6:
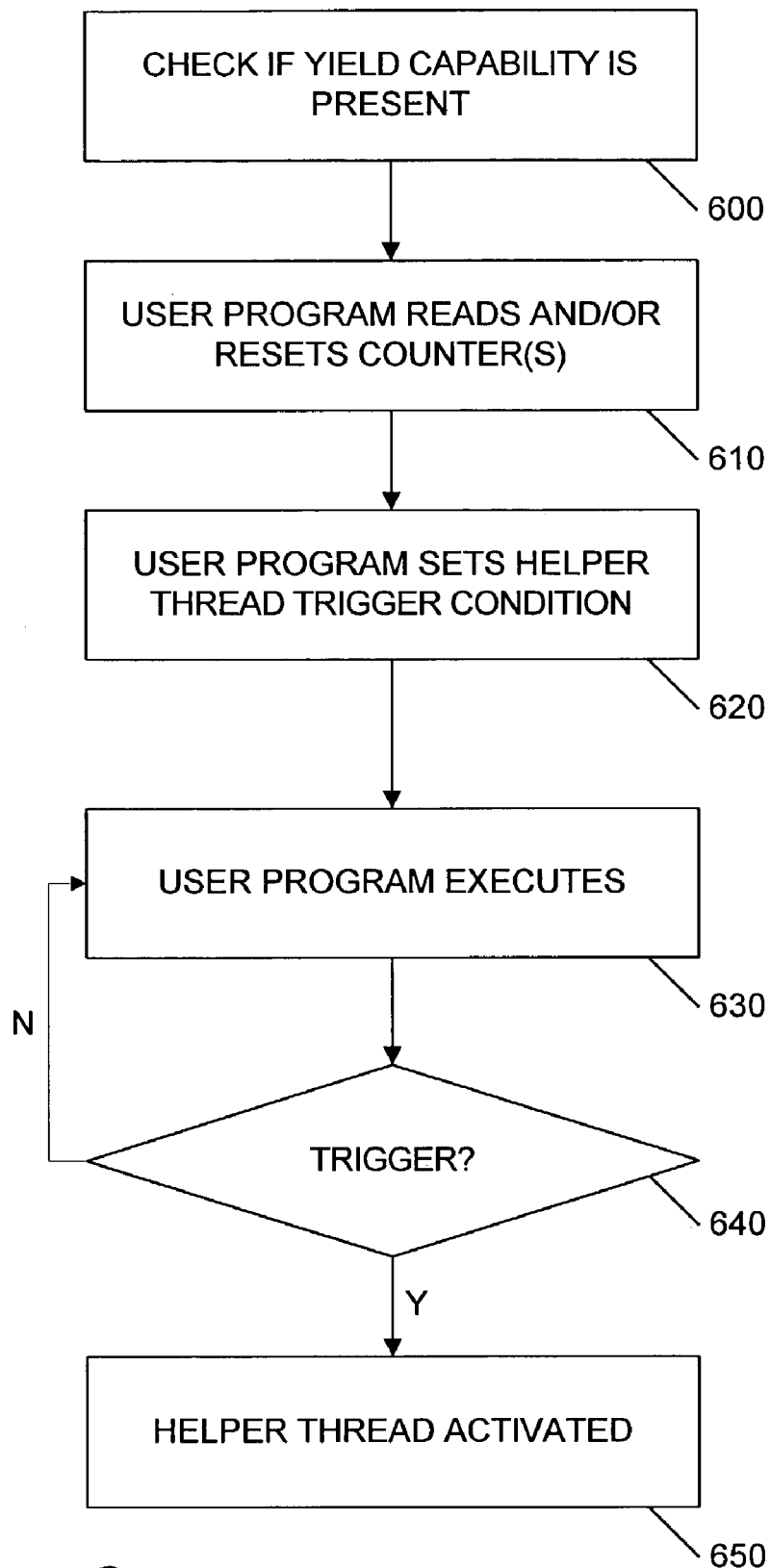
FIG. 6 illustrates a flow diagram for execution of a user program that activates helper threads in response to program-definable triggers according to one embodiment.

FIG. 6 illustrates a flow diagram for execution of a user program that activates helper threads in response to program-definable triggers according to one embodiment. In block 600, the program first tests whether the yield capability is present. The "yield capability" may be used herein as shorthand to refer to the ability of to disrupt processing flow based on a condition or event occurring. Alternatively to testing for yield compatibility support, the yield capability may use opcodes previous defined as no-operation opcodes and/or previously unused or undefined MSRs so that use of the yield capability will have no effect on processor lacking such capabilities. The presence of such capabilities can also be queried via checking special CPU-ID that encodes hints indicating if such capabilities are present on a given processor or platform. Similarly, special instruction such as Itanium's PAL (processor-abstraction layer) call or SALE (system abstraction layer environment) can be used to query the processor specific configuration information including availability of such program-definable yield capability. Assuming the yield capability is present, then the user program may read and/or reset various counters, as indicated in block 610. For example, performance monitor counters may be read so that a delta may be computed, or the values may be reset if that capability is available.

As indicated in block 620, the user program then sets the helper thread trigger condition. The yield capability may be accessible at a low privileged level (e.g., a user level) such that any program or most programs can utilize this feature. For example, the yield capability may be available to ring three privilege level programs in a Pentium® Processor family processor, or the like. Therefore, the user program itself is able to set its own performance-based trigger conditions. A user program or operating system that is aware of existence of such context-sensitive monitor configurations, may choose to save and restore such application specific monitor configuration/setup across thread/process context switch, if the application demands or the operating system can provide persistent monitoring capability.

As indicated in block 630, the user program continues to execute after programming the yield conditions. Whether the yield conditions occur is tested in block 640. If the yield condition does not occur, then program execution continues as indicated in block 630. If the yield condition does occur, then a helper thread is activated, as indicated in block 650. The flowchart form of FIG. 6 tends to imply that a synchronous polling for events occurs, and this approach may be used in some embodiments. However, some embodiments asynchronously react to events when they occur or within a number of clock cycles of when they occur rather than polling for them at certain intervals. In some embodiments, a monitor condition may be set outside of a loop or other code section to detect a particular condition. This concept is demonstrated by the following pseudo-code example for a main thread and a helper thread.

```
main( )
{
    CreateThread(T)
    WaitForEvent()
    n = NodeArray[0]
    setup Helper Trigger //Intrinsic
    while(n and remaining)
    {
        work( )
        n->i = n->next->j + n->next->k + n->next->l
        n = n->next
        remaining--
        //Every Stride Time
        //    global_n = n
        //    global_r = remaining
        //    SetEvent( )
    }
    disable Helper Trigger //Instrinsic
}
T( )
{
    Do Stride times
        n->i = n->next->j + n->next->k + n->next->l
        n = n->next
```

-continued

```
        remaining--
    SetEvent( )
    while(remaining)
    {
        Do Stride times
            n->i = n->next->j + n->next->k + n->next->l
            //Responsible for most effective prefetch
            //due to run-ahead
            n = n->next
            remaining--
            WaitForEvent( )
            if(remaining < global_r)         //Detect Run-Behind
                remaining = global_r //Adjust by jump ahead
                n = global_n
    }
}
```

One advantage of setting the trigger outside the loop is that compiler optimizations within the loop will not be inhibited. For example, some compilers do not optimize loops or sections of code with intrinsics such as those which may be used to activate the yield capability. By placing such intrinsics outside the loop, interference with compiler optimizations may be removed.

Figure 7:
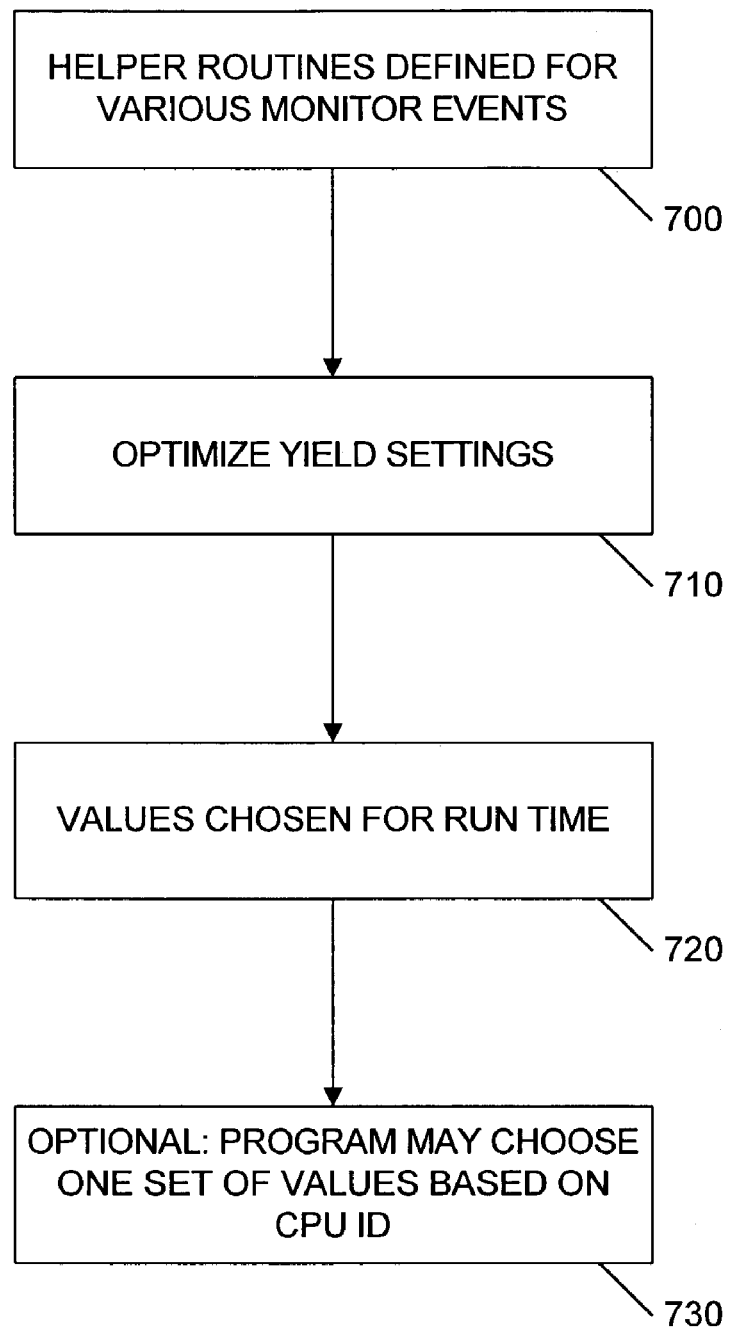
FIG. 7 illustrates a flow diagram for a process of refining monitor settings according to one embodiment.

FIG. 7 illustrates a flow diagram for a process of refining yield settings according to one embodiment. Using a processor with a yield capability or the like, a programmer may design a program as well as helper routines to be invokes under various circumstances as indicated in block 700. Thus, helper routines may be provided for various processing-impeding conditions that the programmer anticipates. The processor can invoke these routines if and when they are needed during execution of the program. The yield settings may include the event schema vector and mask values and/or monitor settings or the like.

On a particular processor, a certain yield setting might result in a favorable execution throughput. However, such determination may be quite difficult manually and thus better derived empirically. Therefore a compiler or other tuning software (e.g., the Intel VTune code analyzer) may repeatedly simulate the code with different yield settings, thereby deriving optimal or desirable settings as indicated in block 710. Thus, desirable values for yield settings for runtime may be chosen as indicated in block 720. A program may be simulated on multiple different versions of a processor or multiple different processors, or in multiple different systems to derive different yield settings. A system or processor identification such as a CPU ID may be used by the program to select which yield settings to apply when it runs as indicated in block 730.

Furthermore, the use of a compact group of settings to optimize performance may facilitate software updates. For example, new yield values may be downloaded to optimize performance for a given processor or may be used to update software when new processors are released. Such new values may allow a binary or modular modification which does not substantially disturb or jeopardize the functionality of the existing software.

Figure 8:
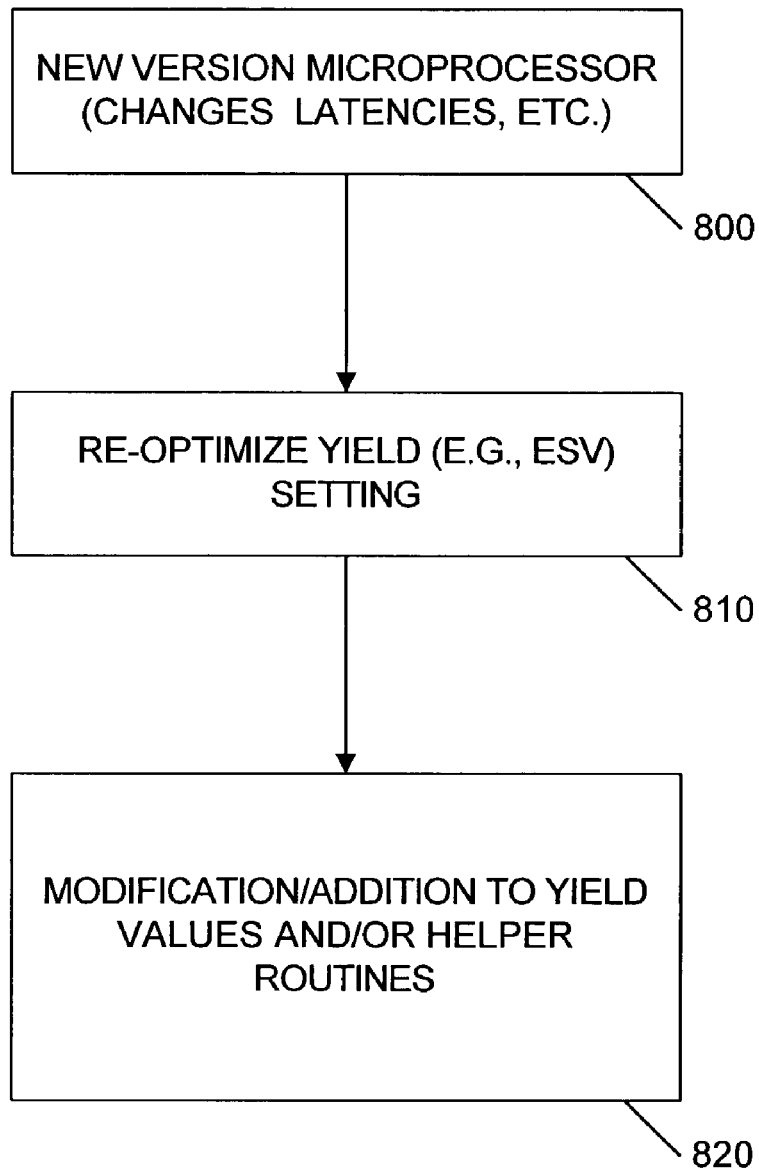
FIG. 8 illustrates a flow diagram for a process of updating software according to one embodiment.

FIG. 8 illustrates a flow diagram for a process of updating software according to one embodiment. As indicated in block 800, a new version of a microprocessor is released. The new version may have different latencies associated with microarchitectural events such as cache misses. Therefore, a routine previously written to activate helper threads after a given number of cache misses may be less effective due to a new cache miss latency. Therefore, the yield settings are re-optimized as indicated in block 810.

Once new settings are derived, the program can be updated (e.g., via an update module that may be a part of the program) as indicated in block 820. A modification or addition to the yield values may be performed, depending on the details of the implementation. Moreover, additional or different helper routines may be added to assist on the new processor implementations. In either case, the yield capability can enable the delivery of performance enhancements after the initial delivery of the software. Such a capability may be quite advantageous in a great variety of scenarios, and may be used just to provide new optimizations without any change in the underlying hardware. Additionally, the underlying software may be maintained in some cases. For example, if a helper routine is written to deal with a synthetic event (e.g., bad cache misses), then on different hardware the composition of events which triggers this routine may be changed without changing the actual routines themselves. For example, the monitor configuration values and/or ESV/ESVM values may be changed and the routines left in tact.

Figure 9A:
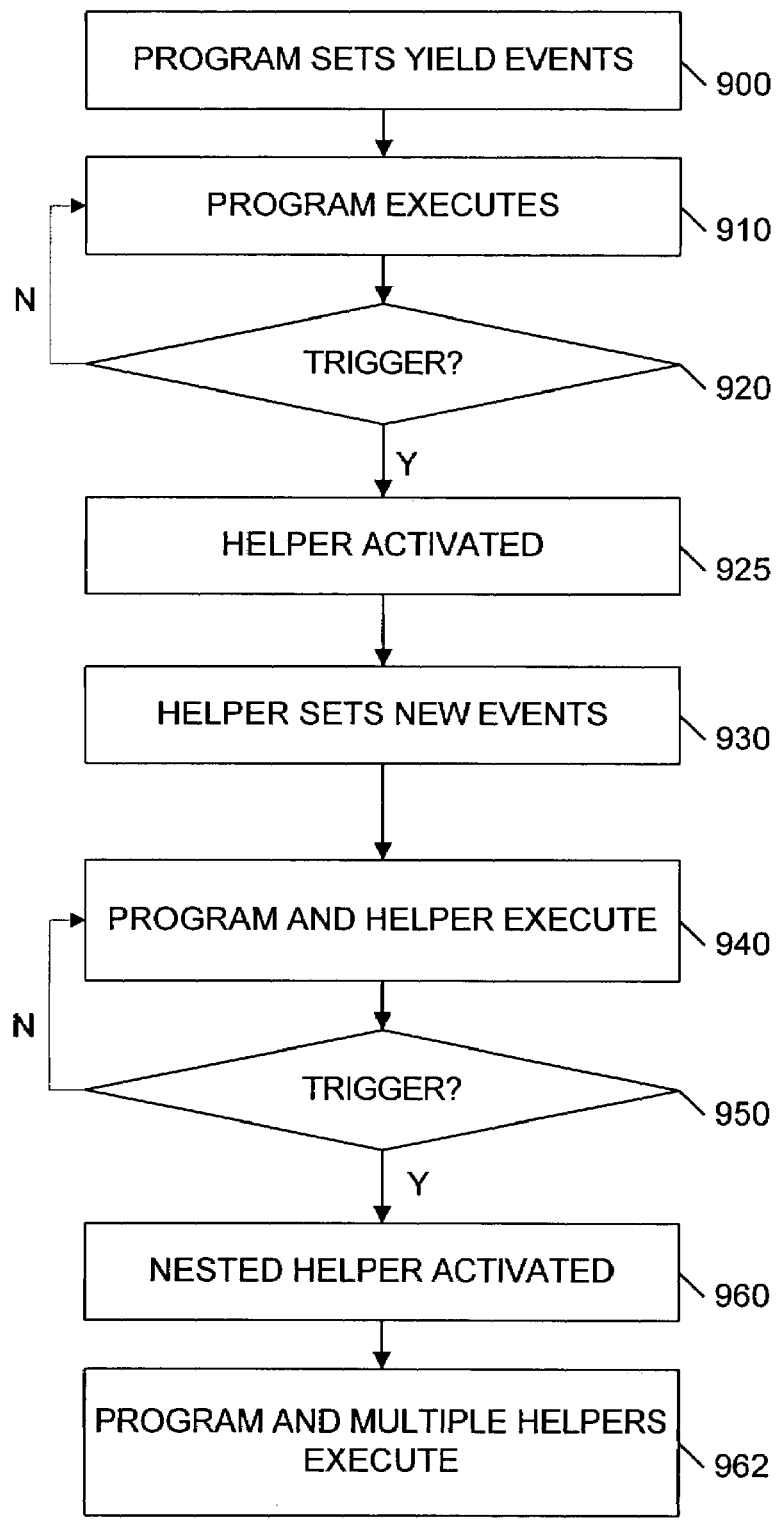
FIG. 9a illustrates a flow diagram in which multiple nested helper threads are activated to assist processing of a program.

The effectiveness of disclosed techniques may be further enhanced by creating nested helper threads, and FIG. 9a illustrates one example of such usage. In the embodiment of FIG. 9a, the program sets the yield event(s) in block 900. The program continues execution in block 910. Whether a yield event (a trigger) occurs is tested in block 920. If no yield event occurs, then program execution continues as shown via block 910. If a yield event occurs, then a helper thread is activated as indicated in block 925. The helper thread sets another yield event as indicated in block 930. Thus, the helper thread effectively identifies a further condition that indicates that further processing assistance may be helpful. Such further condition may indicate whether the first helper thread is effective and/or may be designed to indicate a further condition that may be suspected to develop as a result of or in spite of activation of the first helper thread.

As indicated in block 940, both the program and the helper thread are active and executing threads. These threads execute concurrently in the sense that they are both active and executing in a multithreaded processing resource. Whether the new trigger condition has occurred by the combination of both the program and the helper thread is tested in block 950. If the new triggering condition does not occur, then execution for both threads continues as indicated in block 940. If the new triggering condition does occur, a second or nested helper thread is activated as indicated in block 960. Thereafter, the program and multiple helper threads may be active and execute as indicated in block 962. Thus, multiple nested helper threads may be employed in some embodiments.

In one embodiment, multiple helper threads (either nested or non-nested) may be activated by the use of virtual threads. Rather than dedicating a full set of resources to expand the number of threads a processor can handle, a processor may effectively cache context data (in a cache location, a register location, or other storage location). Accordingly, one physical thread slot may be rapidly switched between multiple threads.

Figure 9B:
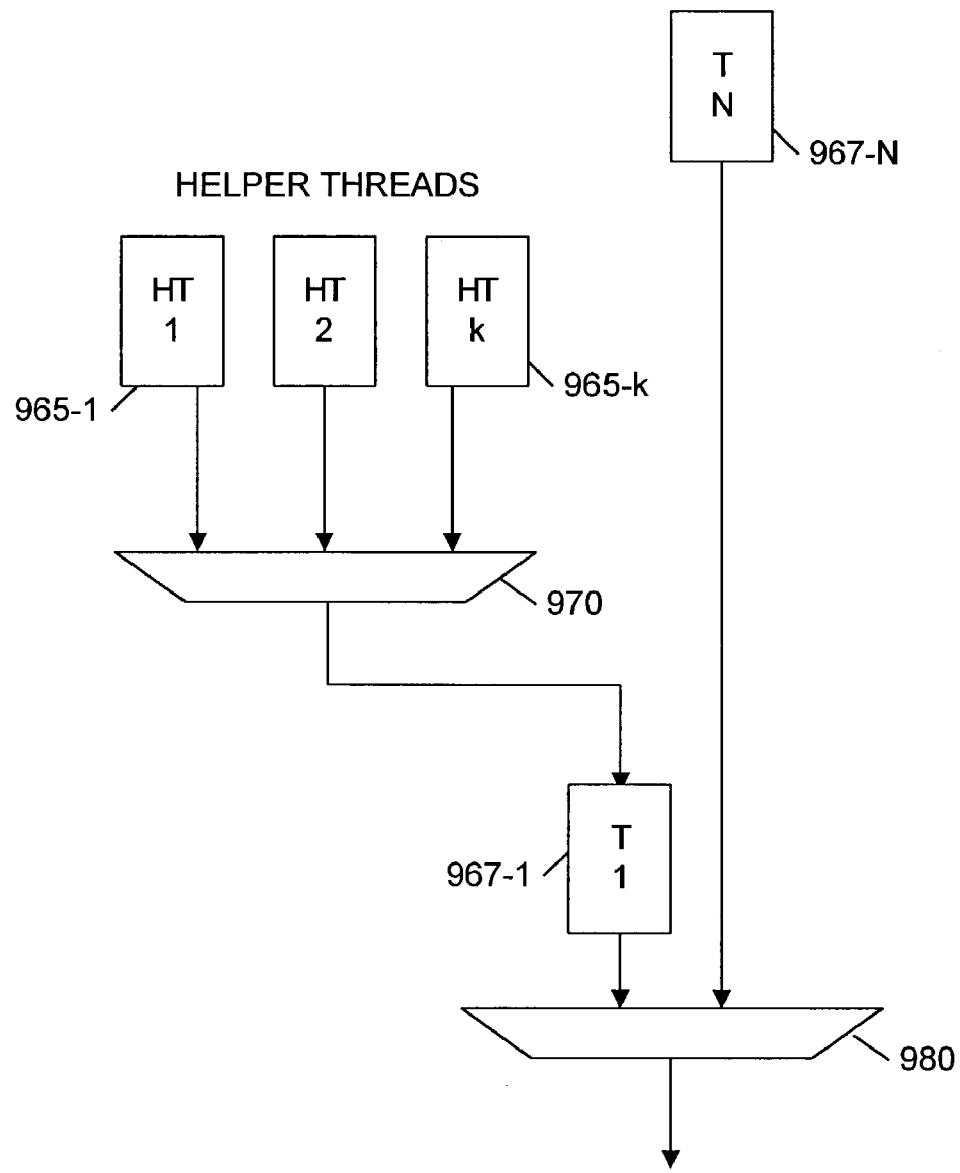
FIG. 9b illustrates thread switching logic for one embodiment which supports virtual threads.

For example, the embodiment of FIG. 9b illustrates thread switching logic according to one embodiment that allows virtual threads to be switched into a limited number of physical thread slots which have dedicated hardware to maintain a thread context. In the embodiment of FIG. 9b, a plurality of helper threads 965-1 through 965-k may be presented to a virtual thread switcher 970. The virtual thread switcher 970 may also include other logic and/or microcode (not shown) to swap context information between the new and previously selected helper threads. The virtual thread switcher 970 may be triggered to switch threads by either a synchronous or an asynchronous stimulus. For example, an asynchronous event defined by a yield-type of instruction may cause a thread switch between the virtual threads. Additionally, helper threads may include synchronous means such as a halt, quiesce, or other type of execution-stopping instruction to signal a switch to another thread. The virtual thread switch logic 970 presents a subset (e.g., in the embodiment of FIG. 9b, one) of the virtual threads to the processor thread switch logic 980. The processor thread switch logic 980 then switches between one of the helper threads as a first thread 967-1 and its other N-1 threads, up to thread 967-N.

Figure 10A:
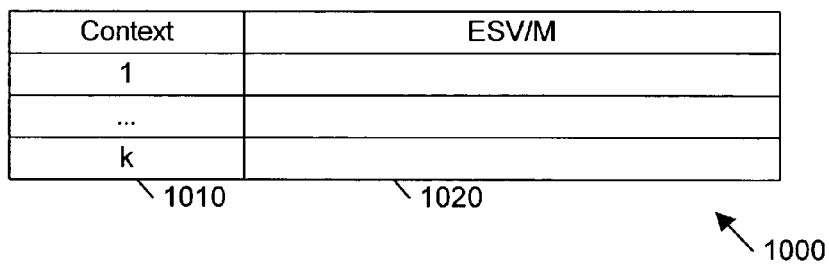
FIG. 10a illustrates one embodiment of a context-sensitive event schema vector and mask implementation.

In some embodiments, it may be advantageous to confine the yield capability to a particular program or thread. Therefore, the yield capability may be made context sensitive or non-promiscuous. For example, FIG. 10a illustrates one embodiment of a context-sensitive event schema vector and mask implementation. In the embodiment of FIG. 10a, a storage area 1000 includes a context indicator field 1010 associated with each event schema vector and mask storage location 1020. The context indicator field identifies the context to which each event schema vector and mask pair applies. For example, a context value such as value of a control register (e.g., CR3 in an x86 processor indicating operating system process ID) may be used. Additional or alternatively, thread number information may be used to define context. Therefore, in some embodiment, when a particular context is active, certain context specific events may be enabled to disrupt processing. As such, the yield mechanism may be non-promiscuous in that its events only affect certain contexts.

Figure 10B:
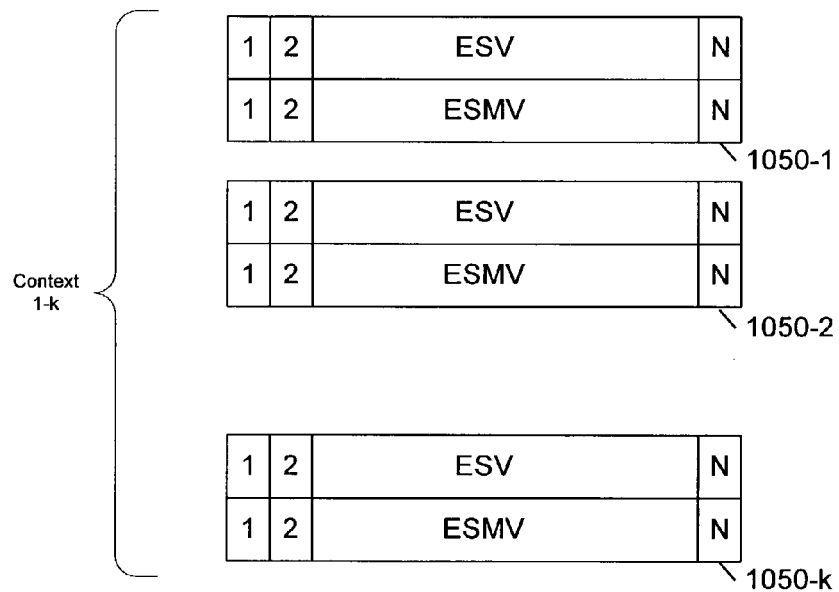
FIG. 10b illustrates one embodiment of a context-sensitive event schema vector and mask implementation.

FIG. 10b illustrates another embodiment of a context-sensitive event schema vector and mask implementation. In the embodiment of FIG. 10b, an integer number k of contexts may be handled by providing one set of event schema vector and mask locations 1050-1 through 1050-k for each of the k contexts. For example, there may be k threads in a multi-threaded processor, and each thread may have an event schema vector and mask or like yield-enablement mechanism. Notably, in other embodiments, it may be undesirable to track events only in certain contexts. For example, events may be reflective of overall processing activity and/or events may be pertain to or be caused by to multiple related threads.

Figure 11:
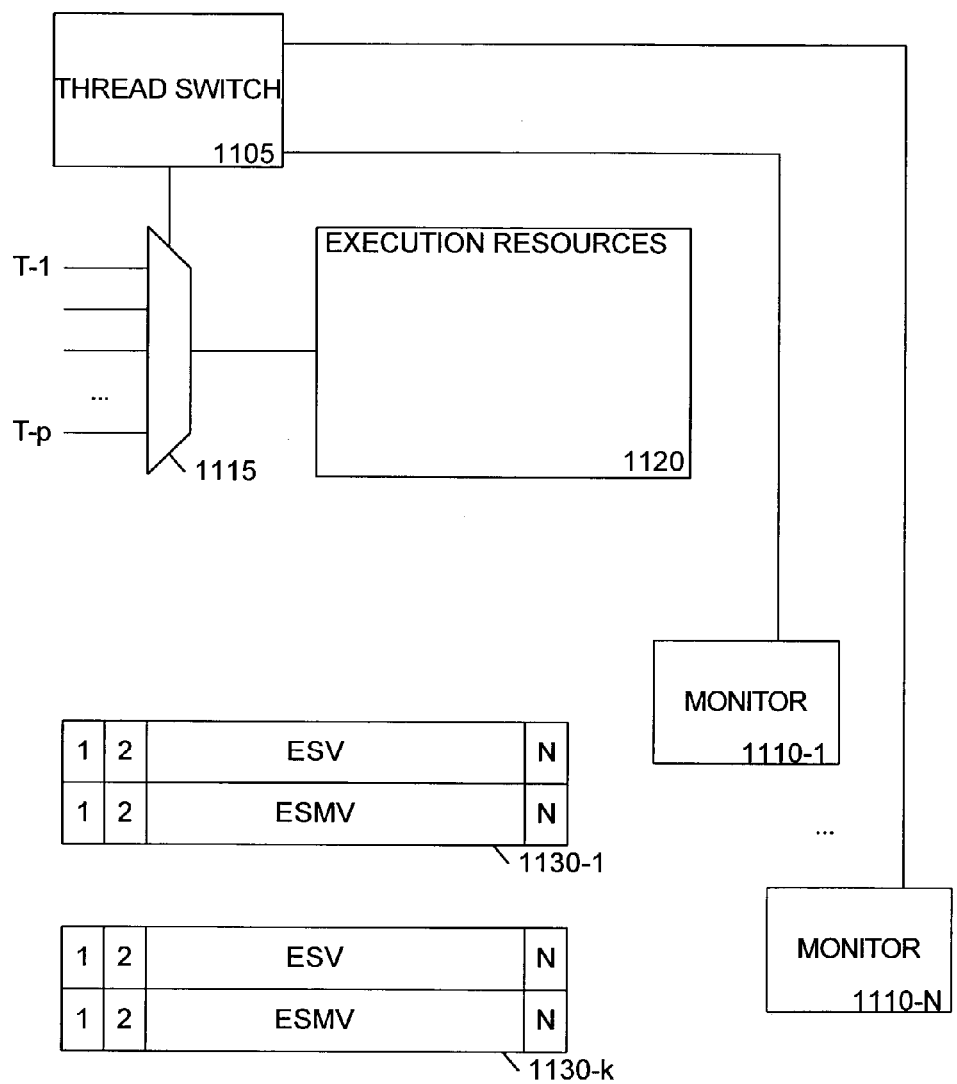
FIG. 11 illustrates one embodiment of a multithreaded processor which performs thread switching based on monitor events.

FIG. 11 illustrates one embodiment of a multithreaded processor which performs thread switching based on monitor or yield-type events. Although many embodiments have been discussed as disrupting processing flow by causing a handler to execute, other embodiments may define events that cause thread switches in a multithreaded processor. For example, in the embodiment of FIG. 11, thread switch logic is coupled to receive signals from a set of N monitors 1110-1 through 1110-N. The thread switch logic 1105 may also be coupled to one or more sets of event schema and mask pairs 1130-1 through 1130-p (p is a positive whole number). The event schema and mask pairs may allow the thread switch to combine and/or disregard certain monitor events in determining when to switch threads.

Execution resource 1120 may support execution of p threads, yet may be indifferent to whether an instruction belongs to a particular thread. The execution resource may be an execution unit, fetch logic, a decoder, or any other resource used in instruction execution. A multiplexer 1115 or other selection resource arbitrates between the various threads for access to the execution resource 1120. One of skill in the art will recognize that various resources may be shared or duplicated in a multithreaded processor and that various resources may have thread-switched access which allows a limited number of threads (e.g., one) to access the resource at a time.

If a set of conditions indicated by one or more monitors and/or one of the event schema vector and mask pairs occurs, the thread switch logic 1105 switches threads of execution. Thus, another thread may be activated instead of the thread that was active when the processor conditions matched those programmed. For example, a user program may control events that trigger thread switches.

In some multithreaded processors, each thread may have an associated set of event schema vector and mask pairs or the like. Thus, as shown in FIG. 11, the multiplexer 1115 may arbitrate between p threads, and there may be a corresponding p event schema and mask pairs. Just because a processor is multithreaded, however, does not mean that all implementations use multiple event schema vectors and masks. Some embodiments may use only one pair, or may use other enablement indicators. For example a single bit could be used as an enablement indicator to turn on or off a particular yield-type capability.

During developement, a design may go through various stages, from creation to simulation to fabrication. Data representing a design may represent the design in a number of manners. First, as is useful in simulations, the hardware may be represented using a hardware description language or another functional description language Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

Thus, techniques for a programmable event driven yield mechanism which may activate other threads are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   execution resources to execute a plurality of instructions;
   a monitor to detect a low progress indicating condition of said execution resources, wherein said monitor is to be accessible by said program to specify said microarchitectural low progress indicating condition, and wherein said monitor is to selectively disrupt processing of at least one program by transferring to a handler in response to detecting said low progress indicating condition;
   said monitor is one of a plurality of monitors and wherein said low progress indicating condition comprises one or more programmable counts being reached by one or more of the plurality of monitors;
   wherein said apparatus is a processor and wherein said low progress indicating condition comprises a programmable combination of processor-internal events; and
   wherein one or more of said plurality of monitors is to cause an asynchronous control flow change tied to one or more processor events rather than execution of a single instruction.

2. The apparatus of claim 1 wherein the monitor is enabled to detect the low progress indicating condition by an instruction, wherein the low progress indicating condition is to be detected subsequent to completion of execution of the instruction.

3. The apparatus of claim 1 wherein said low progress indicating condition is a count of microarchitectural events.

4. The apparatus of claim 1 wherein said plurality of monitors are processor performance monitors that are also readable by a processor instruction.

5. The apparatus of claim 1 wherein said monitor is to cause an imprecise control flow change tied to one or more processor events rather than an instruction-execution boundary.

6. The apparatus of claim 1 wherein said monitor is one of a plurality of monitors, the apparatus further comprising:
   an event schema vector storage location to store an event schema vector comprising a plurality of bits, each bit corresponding to one or more conditions associated with said plurality of monitors;
   an event schema vector mask storage location to store an event schema vector mask comprising a second plurality of bits to indicate whether corresponding bits of the event schema vector are masked.

7. The apparatus of claim 6 wherein each of the plurality of bits of the event schema vector represents an event all of which are to occur to indicate a composite event and disrupt processing unless masked.

8. The apparatus of claim 6 wherein each of the plurality of bits of the event schema vector represent one or more events which disrupts processing unless masked.

9. The apparatus of claim 8 further comprising: a memory to store an event descriptor table.

10. The apparatus of claim 1 wherein said handler is an event handler routine stored in a computer readable medium.

11. The apparatus of claim 10 wherein said execution resources comprise multithreaded execution logic capable of executing a plurality of threads, and wherein said event handler routine, if executed, is to launch a helper thread.

12. The apparatus of claim 11 wherein said helper thread and a first thread executing when said low progress indicating condition is detected are executed concurrently.

13. The apparatus of claim 12 wherein said helper thread sets a new low progress indicating condition to trigger another helper thread.

14. The apparatus of claim 1 wherein said monitor is context sensitive.

15. The apparatus of claim 1 wherein said monitor is programmable by a user program at a low privilege level to activate said handler in response to conditions at least partially caused by said user program.

16. An apparatus comprising:
   execution logic to execute a program;

event detection logic to execute an event handler in response to a program-definable condition associated with the execution logic during execution of the program, wherein the program definable condition is to be specified in the event detection logic by the program;

a monitor to detect a low progress indicating condition of said execution resources, wherein said monitor is to be accessible by said program to specify said microarchitectural low progress indicating condition, and wherein said monitor is to selectively disrupt processing of at least one program by transferring to a handler in response to detecting said low progress indicating condition;

wherein said low progress indicating condition comprises one or more programmable counts being reached by one or more of the plurality of monitors;

wherein said apparatus is a processor and wherein said low progress indicating condition comprises a programmable combination of processor-internal events; and wherein one or more of said plurality of monitors is to cause an asynchronous control flow change tied to one or more processor events rather than execution of a single instruction.

17. The apparatus of claim 16 further comprising: an event enablement indicator, the event enablement indicator being programmable to indicate whether to presently recognize an event.

18. The apparatus of claim 16 wherein said event detection logic is programmable by a program operative at a user privilege level.

19. The apparatus of claim 18 wherein said event detection logic is context sensitive.

20. The apparatus of claim 16 further comprising:
an event schema vector storage location to store an event schema vector having a plurality of event occurrence indicator bits each associated with one of the plurality of monitors;
an event schema vector mask storage location to store an event schema vector mask having a plurality of event schema mask bits, each event schema mask bit being associated with one of the plurality of event occurrence indicator bits.

21. The apparatus of claim 16 wherein said program-definable condition comprises an occurrence of a program-defined combination of one or more microarchitectural events.

22. The apparatus of claim 21 further comprising a plurality of monitors to count microarchitectural events, wherein said program-defined combination of one or more microarchitectural events comprises each of said plurality of monitors reaching a programmable count.

23. A method comprising:
Executing a user privilege level program to program a monitor to represent a microarchitectural low progress condition in a multithreaded microprocessor;
spawning a helper thread in response to detecting the low progress microarchitectural condition represented in the monitor;
a monitor to detect a low progress indicating condition of said execution resources, wherein said monitor is to be accessible by said program to specify said microarchitectural low progress indicating condition, and wherein said monitor is to selectively disrupt processing of at least one program by transferring to a handler in response to detecting said low progress indicating condition;

wherein said low progress indicating condition comprises one or more programmable counts being reached by one or more of the plurality of monitors;

wherein said apparatus is a processor and wherein said low progress indicating condition comprises a programmable combination of processor-internal events; and wherein one or more of said plurality of monitors is to cause an asynchronous control flow change tied to one or more processor events rather than execution of a single instruction.

24. The method of claim 23 wherein programming a monitor to represent a low progress microarchitectural condition comprises setting a value to indicate a type of the micro architectural condition and setting a programmable count value for a number of occurrences of the type of the microarchitectural condition for the monitor.

25. The method of claim 23 wherein programming the monitor to represent a microarchitectural condition comprises writing a value to a model specific register to represent the microarchitechtural condition.

26. A system comprising:
a processor comprising a user programmable hardware monitor to be programmed to detect a processor condition and to cause execution of a handler in response to detecting the processor condition;
a storage medium associated with the processor to store the handler, the handler comprising at least one instruction that causes a helper thread to be generated;
a monitor to detect a microarchitectural low progress indicating condition of said execution resources, wherein said monitor is to be accessible by said program to specify said microarchitectural low progress indicating condition, and wherein said monitor is to selectively disrupt processing of at least one program by transferring to a handler in response to detecting said low progress indicating condition;

wherein said low progress indicating condition comprises one or more programmable counts being reached by one or more of the plurality of monitors;

wherein said apparatus is a processor and wherein said low progress indicating condition comprises a programmable combination of processor-internal events; and wherein one or more of said plurality of monitors is to cause an asynchronous control flow change tied to one or more processor events rather than execution of a single instruction.

27. The system of claim 26 wherein said processor condition comprises an indication of a plurality of processor events.

28. The system of claim 26 wherein said processor condition comprises the user programmable hardware monitor reaching a count of a single type of event.

29. The system of claim 26 wherein said processor condition comprises a plurality of user programmable hardware monitors reaching a plurality of counts for a plurality of processor-internal events.

30. The system of claim 29 further comprising a programmable enablement control to enable or disable execution of the handler in response to said plurality of user programmable hardware monitors reaching the plurality of counts.

31. The system of claim 26 further comprising a communications interface.

32. The system of claim 31 further comprising an update module to cause the system to receive via the communications interface a new processor condition to program into the programmable hardware monitor.

33. The system of claim 32 wherein said update module is also to cause the system to receive via the communications interface a new helper thread associated with said new processor condition.

34. A processor comprising:

execution resources to execute a plurality of instructions;

a monitor to detect a microarchitectural low progress indicating condition of said execution resources, wherein said monitor is to be accessible by said program to specify said microarchitectural low progress indicating condition;

logic to be update to represent a combination of a plurality of different microarchitectural events associated with the execution resources in response to execution of a user instruction of the plurality of instructions, wherein the logic is to cause a disruption of execution of the plurality of instructions in response to detecting the programmable combination of the plurality of different miroarchitectural events associated with the execution resources, and said microarchitectural low progress indicating condition;

wherein said low progress indicating condition comprises one or more programmable counts being reached by one or more of the plurality of monitors;

wherein said apparatus is a processor and wherein said low progress indicating condition comprises a programmable combination of processor-internal events; and wherein one or more of said plurality of monitors is to cause an asynchronous control flow change tied to one or more processor events rather than execution of a single instruction.

35. The processor of claim 34 wherein said disruption comprises a thread switch.

36. The processor of claim 34 wherein said disruption comprises calling a handler routine.

37. The processor of claim 34 wherein said instruction comprises a write to a register.

* * * * *